US009130617B2

(12) United States Patent  
Tahir et al.

(10) Patent No.: US 9,130,617 B2
(45) Date of Patent: Sep. 8, 2015

(54) AUTOMATIC COMPENSATION OF TRANSMIT POWER OF SEPARATE TRANSMIT CHAINS IN MIMO COMMUNICATION

(71) Applicant: QUALCOMM Incorporated, San Diego, CA (US)

(72) Inventors: Ehab Tahir, Mississauga (CA); John Chappel, Mississauga (CA)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 13/789,380

(22) Filed: Mar. 7, 2013

(65) Prior Publication Data

US 2014/0254639 A1  Sep. 11, 2014

(51) Int. Cl.
*H04B 1/38* (2015.01)
*H04L 5/16* (2006.01)
*H04B 7/04* (2006.01)
*H04W 52/42* (2009.01)

(52) U.S. Cl.
CPC ............. *H04B 7/0426* (2013.01); *H04W 52/42* (2013.01)

(58) Field of Classification Search
CPC .. H04L 5/0053; H04W 72/042; H04B 7/0413
See application file for complete search history.

(56) References Cited

U.S. PATENT DOCUMENTS

| | | | |
|---|---|---|---|
| 7,099,678 B2* | 8/2006 | Vaidyanathan | 455/500 |
| 8,229,019 B2 | 7/2012 | Kotecha et al. | |
| 8,543,152 B2* | 9/2013 | Sutivong et al. | 455/522 |
| 2008/0287155 A1* | 11/2008 | Xu et al. | 455/522 |
| 2008/0310487 A1* | 12/2008 | Hammerschmidt et al. | 375/219 |
| 2009/0186648 A1 | 7/2009 | Larsson | |
| 2010/0093282 A1* | 4/2010 | Martikkala et al. | 455/63.4 |
| 2010/0098030 A1 | 4/2010 | Wang et al. | |
| 2011/0077044 A1 | 3/2011 | Sampath et al. | |
| 2011/0263281 A1 | 10/2011 | Cai et al. | |

* cited by examiner

*Primary Examiner* — Shuwang Liu
*Assistant Examiner* — Gina McKie
(74) *Attorney, Agent, or Firm* — DeLizio Law, PLLC (57) ABSTRACT

Systems and methods are disclosed for receivers of transmit chains of a MIMO system to receive transmit power information and to compute channel characteristics of the transmit chains to enable dynamic adjustment of the transmit power on the transmit chain to optimize an overall data throughput while meeting a maximum emission limit, such as a regulatory limit on emitted power. The transmit power and the data rate on the transmit chains may be independently controlled. The receiver of the MIMO system may determine the new transmit power for the transmit chains from the computed channel characteristics and the current transmit power of the transmit chains. Alternatively, the receiver may transmit the computed channel characteristics of the transmit chains to the transmitter for the transmitter to determine the new transmit power for the transmit chains. The transmitter may use the new transmit power to transmit new data on the transmit chains.

24 Claims, 5 Drawing Sheets

AUTOMATIC COMPENSATION OF TRANSMIT POWER OF SEPARATE TRANSMIT CHAINS IN MIMO COMMUNICATION

TECHNICAL FIELD

This application generally relates to communication systems. In particular, this application relates to control of transmit power of transmit chains in multiple-in multiple-out (MIMO) communication systems.

BACKGROUND

Communication systems using multiple-input multiple-output (MIMO) technology enable increased throughput for a given transmit power by exploiting spatial diversity at the transmitter and at the receiver. In a wireless MIMO system, gain and spatial diversity introduced by multiple antennas may increase spectral efficiency. Similarly, in a wire-line MIMO system, multiple physical channels may be combined with beam-forming to increase the total data throughput compared to a single-input single-output (SISO) system of identical transmit power.

Regulatory requirements typically impose limits on the maximum radiated emission of a communication system. These limits, which vary by regions, seek to limit the amount of power transmitted from a communication device to reduce interference on other devices operating in the same frequency band. For example, the HomePlug AV specification for North America limits the maximum transmit power spectral density to −50 dBm/Hz for bandwidth between 2-30 MHz for a device communicating over home power lines. For systems employing MIMO technology where there are multiple simultaneous transmit chains, the maximum transmit power applies to the overall emissions from the multiple transmit chains. Thus, the maximum transmit power may be distributed among the multiple transmit chains of the MIMO system, resulting in the transmit power on a single transmit chain to be less than the transmit power in a SISO system. If there is low data throughput on some of the transmit chains due to poor channel characteristics, the overall throughput of the multiple transmit chains may be less than the throughput of a SISO system. For example, if the transmit power is equally divided between two transmit chains of a MIMO HomePlug AV2 device, and if a first transmit chain experiences low throughput due to interference, the second transmit chain may not have sufficient diversity gain to compensate for the lower throughput of the first transmit chain. This may result in a lower overall data throughput in the MIMO device compared to a SISO device transmitting at maximum power through a single transmit chain Accordingly, there is a need to automatically compensate for different channel characteristics in the multiple transmit chains of a MIMO system to increase the overall data throughput while staying within the maximum transmit power imposed by regulatory requirements.

SUMMARY

Systems and methods are disclosed for communication devices employing MIMO technology to automatically and dynamically adjust the transmit power of the transmit chains to increase an overall data throughput while meeting a maximum emission limit. In one embodiment, a MIMO HomePlug AV2 transceiver has two transmit chains for transmitting data over two pairs of in-home power lines. The overall transmit power from the two transmit chains cannot exceed a maximum emission limit required by the HomePlug AV2 specification. The transmit power and the data rate on the two transmit chains may be independently controlled.

A second transceiver may receive the data transmitted over the two transmit chains. In one embodiment, the second transceiver may calculate the received signal power, the signal-to-noise ratio (SNR), and the effective data rate on each of the two transmit chains. The second transceiver may receive from the first transceiver information on the transmitted power of the two transmit chains. Due to channel characteristics, such as gain and interference, that are dynamic and independent on the two transmit chains, the received signal power, the SNR and the data rate on the two chains may be different, even if the transmit powers are the same. Because the data rate is a function of the SNR and the SNR is a function of the transmitted power and the channel characteristics, the transmit power of the two transmit chains may be varied to exploit the different channel characteristics of the two transmit chains. For example, after calculating the SNR, the data rate, and knowing the current transmit power on the two transmit chains, the second transceiver may compute a new transmit power for each of the two transmit chains so as to increase their overall data rate while staying within the maximum emission limit.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Systems and methods are disclosed for receivers of transmit chains of a MIMO system to receive transmit power information and to compute channel characteristics of the transmit chains to enable dynamic adjustment of the transmit power of the transmit chains. The power of the transmit chains is adjusted to increase (and in some embodiments maximize) an overall data throughput while staying within a power constraint, such as a regulatory limit on emitted power. The channel characteristics may include one or more of signal-to-noise ratio (SNR), carrier-to-interference ratio (CIR), and data throughput, etc., for each transmit chain. The receiver of a MIMO transmit chain may determine the new transmit power for the transmit chain from the computed channel characteristics and the current transmit power of the transmit chains. The receivers may also determine transmission parameters such as modulation, coding rate, etc. for the transmission chain to increase the data throughput. In other embodiments, the receiver may transmit the computed channel characteristics of the one or more transmit chains to the transmitter for the transmitter to determine the new transmit power for the transmit chains. Regardless of whether the receiver or the transmitter determines the new transmit power, the transmitter may use the new transmit power to transmit new data on the transmit chains.

Figure 1:
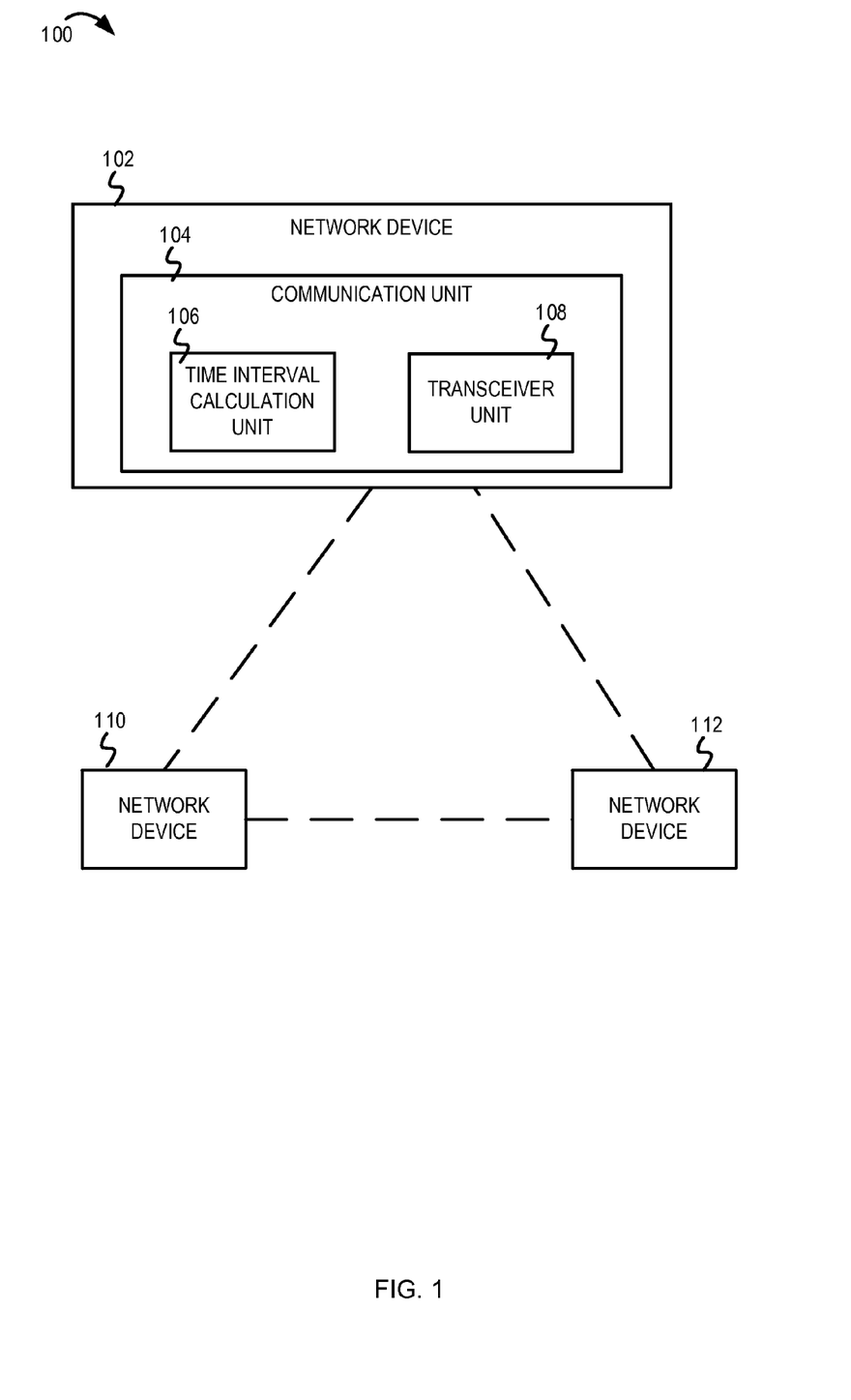
FIG. 1 shows a system block diagram of a MIMO HomePlug AV2 communication system used for automatic compensation of transmit power on two MIMO transmit chains according to one or more embodiments of the present disclosure.

FIG. 1 shows a system block diagram of a MIMO HomePlug AV2 communication system used for automatic compensation of transmit power on two MIMO transmit chains according to one or more embodiments of the present disclosure. A first transceiver, transceiver-1 102, communicates with a second transceiver, transceiver-2 104, via two transmit chains, transmit chain-1 106 and transmit chain-2 108. For ease of discussion, data from transceiver-1 102 to transceiver-2 104 may be referred to as downlink data, and data from transceiver-2 104 to transceiver-1 102 may be referred to as uplink data, although these designations are arbitrary. The two transmit chains may be carried on any two pairs of home power-line wiring formed by the line, neutral, or ground wires (e.g., line-neutral, line-ground, or neutral-ground pairs). Data on transmit chain-1 106 and transmit chain-2 108 may be interleaved data from a data source. While transceiver-2 104 is shown as the lone receiving unit, multiple transceivers may communicate with transceiver-1 102 over the two transmit links to form a home network. For example, transceiver-1 102 may be connected to an Internet gateway/router and may transmit downlink data on the two transmit chains via power-line wiring to transceiver-2 104 and other devices. Similarly, transceiver-2 104 may transmit uplink data to transceiver-1 102 on the transmit chains for the data to be routed externally to the Internet or internally to another device on the home network.

While embodiments of the present disclosure is described in the wire-line transmission medium of a MIMO HomePlug AV2 network, wireless communication systems using MIMO technology are also possible embodiments. For example, transceiver-1 102 may be an access point (AP) of a wireless LAN or a base station in a cellular network; transceiver-2 104 may be a laptop, a smart phone, or other client devices communicating with transceiver-1 102 in a variety of multiple access schemes. In other embodiments, the number of transmit chains may be greater than 2. For example, the number of downlink transmit chains may be determined by the number of antennas at transceiver-1 102.

Transceiver-1 102 may include transmitter-1A 110 and receiver-1A 112 for transmitting downlink data and receiving uplink data, respectively, to/from transmit chain-1 106, and transmitter-1B 116 and receiver-1B 114 for transmitting down link and receiving uplink data, respectively, to/from on transmit chain-2 108. Transceiver-1 102 may also include a processor-1 118 and a memory-1 119. Transmitter-1A 110 and transmitter-1B 116 may process data for transmission on the two transmit chains by performing de-multiplexing, coding, interleaving, and modulation, etc., of downlink data using downlink transmission parameters as selected by the processor-1 118. The downlink transmission parameters for a transmit chain may be independently selected as a function of the expected or estimated channel characteristics of the transmit chain. Conversely, receiver-1A 112 and receiver-1B 114 may process received data by performing demodulation, de-interleaving, decoding, and multiplexing of uplink data using uplink transmission parameters. Data on transmit chain-1 106 and transmit chain-2 108 are transmitted with separate transmit power to increase or maximize an overall data throughput while keeping the combined transmit power within a limit imposed by regulatory requirements on maximum radiated emission. Transmitter-1A 110 and transmitter-1B 116 may transmit the current transmit power on transmit chain-1 106 and transmit chain-2 108 for transceiver-2 104 to compute a new transmit power as a function of the channel characteristics on the transmit chains.

Similar to transceiver-1 102, transceiver-2 104 may include receiver-2A 120 and transmitter-2A 122 for receiving downlink data from, or transmitting uplink data to transmit chain-1 106, and receiver-2B 124 and transmitter-2B 126 for receiving downlink data from, or transmitting uplink data to transmit chain-2 108. Transceiver-2 104 may also include a processor-2 128 and a memory-2 129. Receiver-2A 120 and receiver-2B 124 may perform receiver data processing such as demodulation, de-interleaving, decoding, and multiplexing etc., of downlink data using the same downlink transmission parameters used by transmitter-1A 110 and transmitter-1B 116. Receiver-2A 120 and receiver-2B 124 may receive from transmitter-1A 110 and transmitter-1B 116 the downlink transmission parameters and the transmit power used to transmit the downlink data on the two transmit chains. Receiver-2A 120 and receiver-2B 124 may also measure channel characteristics such as SNR, CIR, data throughput, etc. for adjusting the transmit power to increase the overall data throughput.

In addition, the downlink transmission parameters may also be adjusted as a function of the computed channel characteristics of the transmit chains and the new transmit power. For example, a new modulation scheme, FEC coding method, coding rate, etc. may be determined to optimize the spectral efficiency of downlink transmission using the new transmit power over the two transmit chains. A processor-2 128 of transceiver-2 104 may determine the new transmit power and the new transmission parameters for downlink transmission over transmit chain-1 106 and transmit chain-2 108. Transmitter-2A 122 and transmitter-2B 126 may transmit the new transmit power and the new transmission parameters as uplink data to transceiver-1 102 for use in downlink transmission of new data. In other embodiments, transmitter-2A 122 and transmitter-2B 126 may transmit the computed channel characteristics of the transmit chains as uplink data to transceiver-1 102 for processor-1 118 to determine the new transmit power and the new transmission parameters for new downlink data.

Figure 2:
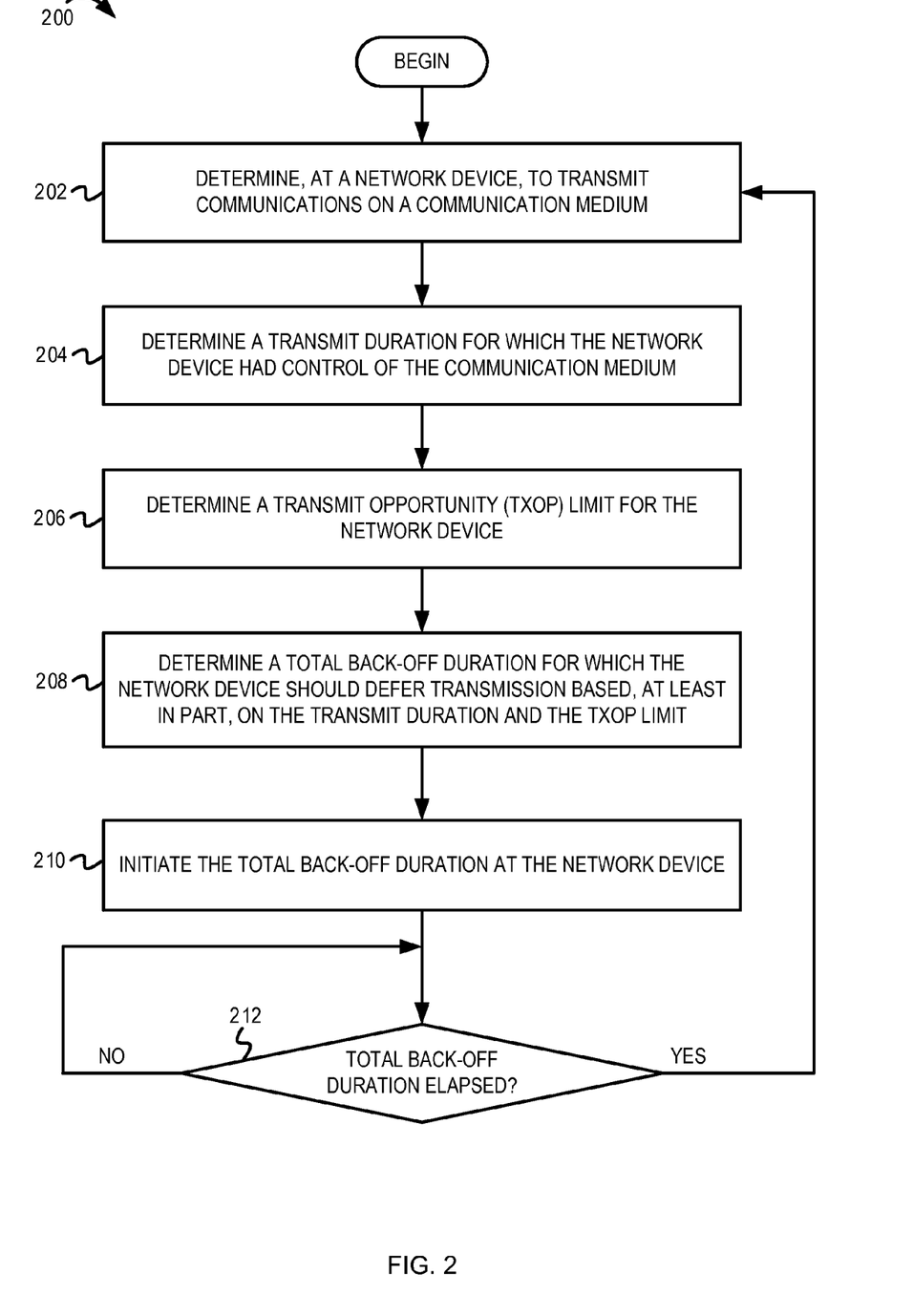
FIG. 2 shows a flow chart for automatic compensation of transmit power of the two MIMO transmit chains of FIG. 1 according to one or more embodiments of the present disclosure.

FIG. 2 shows a flow chart for automatic compensation of transmit power of the two MIMO transmit chains of FIG. 1 according to one or more embodiments of the present disclosure. In 202, transceiver-2 104 receives from transceiver-1 102 the current transmit power used for downlink transmission over transmit chain-1 106 and transmit chain-2 108. The current transmit power may be received as control data, in the header of an IP data packet, or as part of other control packets. In other embodiments, transceiver-2 104 may receive through the same control protocol the current transmission parameters such as the modulation scheme, coding scheme, code rate, etc. used for the downlink data over the two transmit chains. The transmission parameters for each transmit chain may be determined by transceiver-1 102 as a function of the transmit power and the estimated channel characteristics of the transmit chain. The transmission parameters may be transmitted from transceiver-1 102 using a predetermined modulation and coding scheme so that the transmission parameters may be received by transceiver-2 104 to properly demodulate and decode the downlink data In 204, transceiver-2 104 calculates the channel characteristics of the two transmit chains from the downlink data. The channel characteristics may be expressed as one or more of SNR, CIR, and downlink data throughput on transmit chain-1 106 and transmit chain-2 108. SNR for a transmit chain may be calculated as a ratio of the received signal power and noise power, where the noise power may include receiver noise and interference from the other transmit chain. The received signal power may be the product of the transmit power from transceiver-1 102 and a path gain of the transmit chain. CIR may also be calculated as a ratio of the carrier power and interference, where the carrier power may be the product of the transmit power of the carrier and the path gain. Data throughput may be expressed as a data rate (e.g., bit per second) of data bits that have been successfully decoded.

In 206, using the current transmit power and the channel characteristics of the two transmit chains, transceiver-2 104 determines the new transmit power for the transmit chains to increase (and in some embodiments maximize) the overall data throughput while staying within the maximum power limit. Because data throughput is a function of the SNR and the transmission parameters, and the SNR is a function of the transmitted power and the channel characteristics, by re-allocating the overall transmit power among the individual transmit power of the two transmit chains, the data throughput on each transmit chain may be changed to increase the overall data throughput.

In one embodiment, the determination of the new transmit power may be based on prior knowledge of the data throughput on a single transmit chain for a known transmit power when operating in a single-input single-output (SISO) mode. For example, if the current data rate for the current transmit power on a first transmit chain of the MIMO is lower than the data rate of a SISO channel operating at a higher transmit power, the transmit power on the first MIMO transmit chain may be increased to the higher transmit power of the SISO channel. The transmit power on the second MIMO transmit chain may be correspondingly decreased to keep the overall transmit power within the maximum power limit. As such, the data rate on the first transmit chain may be increased to match the SISO data rate. The data rate on the second transmit chain would be the gain in the overall data rate over the SISO channel.

In another embodiment, the transmit power from transceiver-1 102 for a first transmit chain may be lower than that for a second transmit chain. However, the SNR received at transceiver-2 104 for the first transmit chain (e.g., transmit chain-1 106) may be higher than the SNR for the second transmit chain (e.g., transmit chain-2 108) because the first transmit chain may experience less signal fading and/or less interference than the second transmit chain. As such, it may be desirable to increase the transmit power on the first transmit chain to exploit its more favorable channel characteristics and to decrease the transmit power on the second transmit chain to mitigate the effects of its less favorable channel characteristics. The results may be an increase in the overall data throughput.

In another embodiment, transceiver-2 104 may have knowledge of the relationship between data throughput on a transmit chain and SNR as compiled from historical measurements of channel characteristics. The SNR for the transmit chains may be measured and analyzed using the historical relationship between SNR and data throughput to determine how data throughput may be improved. For example, transceiver-2 104 may discover that the SNR for a first transmit chain is excessive and that the SNR may be decreased with a minimal effect on the data throughput. On the other hand, the SNR for a second transmit chain may be at a level such that a small increase may yield a significant increase in data throughput. Therefore, the transmit power for the first transmit chain may be decreased and the transmit power for the second transmit chain may be increased to maintain the same transmit power. Accordingly, the resulting increase in the data throughput on the second transmit chain may more than compensate for the small decrease in the data throughput on the first transmit chain to yield an increase in the overall data throughput without increasing the overall transmit power. The amount of change in the transmit power may be a function of the current transmit power. For example, the transmit power from a power amplifier may need some headroom below a peak transmit power to avoid the non-linear region close to the peak transmit power. Therefore, the current transmit power may be considered when determining the new transmit power so as to leave sufficient power amplifier headroom.

Referring back to FIG. 2, in 208, transceiver-2 104 transmits the new transmit power for transmit chain-1 106 and transmit chain-2 108 to transceiver-1 102 as uplink data. In addition, transceiver-2 104 may determine the new transmission parameters for the transmit chains corresponding to the new transmit power and may transmit the new transmission parameters as uplink data as well. In other embodiments, instead of transceiver-2 104 determining the new transmit power and transmitting the new transmit power to transceiver-1 102, transceiver-2 104 may transmit the computed channel characteristics of the transmit chains as uplink data to transceiver-1 102 for transceiver-1 102 to determine the new transmit power and any new transmission parameters.

In 210, transceiver-1 102 transmits data on transmit chain-1 106 and transmit chain-2 108 using the new transmit power and any new transmit parameters. 202-210 of FIG. 2 may be repeated to dynamically and automatically adjust the transmit power on the MIMO transmit chains to compensate for changing channel characteristics and to increase the data throughput while staying within a maximum transmit power limit. In addition, by analyzing the current transmit power and the channel characteristics of one transmit chain in conjunction with those of the other transmit chain(s), the effects of adjusting the transmit power on two or more transmit chains are considered together to provide a better solution than analyzing one transmit chain alone. It is noted that, in some embodiments, the operations described in 202-208 of FIG. 2 can be performed by transceiver-2 104 and the operations described in 210 of FIG. 2 can be separately performed by transceiver-1 102. 210 of FIG. 2 is shown with dashed lines to indicate that, in some embodiments, the operations described in 202-208 of FIG. 2 can be performed separately by a different transceiver than the operations described in 210. Similarly, as described herein, in other embodiments, the operations described in 202-208 of FIG. 2 can be performed by transceiver-1 102 and the operations described in 210 of FIG. 2 can be separately performed by transceiver-2 104.

Figure 3:
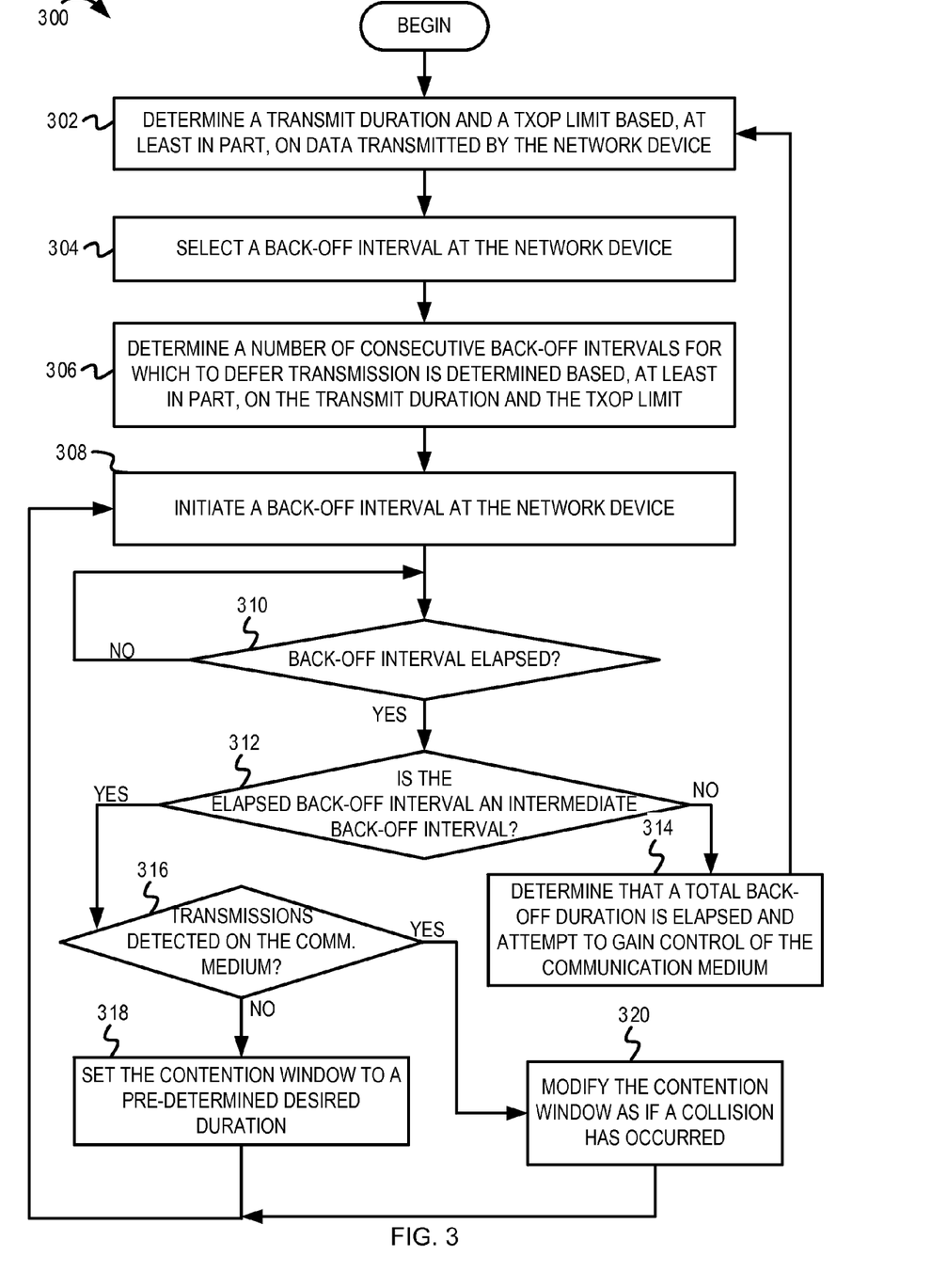
FIG. 3 shows a schematic block diagram of a transceiver used to receive a MIMO transmit chain and to determine the new transmit power for feedback to a transmitter of the transmit chain according to one or more embodiments of the present disclosure.

FIG. 3 shows a schematic block diagram of a transceiver 300 used to receive a MIMO transmit chain and to determine the new transmit power for feedback to a transmitter of the transmit chain according to one or more embodiments of the present disclosure. Transceiver 300 receives received signal 316 and transmits transmit signal 318 over the MIMO transmit chain. Transceiver 300 may be an implementation of receiver-2A 120/transmitter-2A 122 or receiver-2B 124/transmitter-2B 126 of FIG. 1 used to receive/transmit data over transmit chain-1 106 or transmit chain-2 108 from/to transceiver-1 102. For a MIMO HomePlug AV2 system, receiver frontend 302 may be an analog frontend circuitry that receives and filters received signal 316 over a pair of power-line wiring. For a wireless MIMO channel, receiver frontend 302 may be an RF frontend that filters, amplifies, and down-converts the RF signal of received signal 316 to baseband.

A demodulator and decoder module 304 ("demodulator decoder module") performs the demodulation and decoding of the received data based on the modulation and encoding schemes used by a transmitter to modulate and encode the data. For example, demodulator decoder module 304 implemented in receiver-2A 120 of FIG. 1 may demodulate and decode data received over transmit chain-1 106 based on the modulation and encoding schemes used by transmitter-1A 110 to modulate and encode the data. Information on the modulation and encoding schemes may be contained in transmission parameters received from the transmitter. The transmitter may transmit the transmission parameters using a predetermined modulation and coding scheme in a control data packet. Demodulator decoder module 304 may demodulate and decode the transmission parameters in the control packet. The modulation and coding schemes contained in the decoded transmission parameters are then used by demodulator decoder module 304 to demodulate and decode all subsequent received data until the transmission parameters are changed. Because modulation and coding schemes determine the spectral efficiency of the data transmission, the transmission parameters may be dynamically changed to increase the spectral efficiency when the channel characteristics of the transmit chain becomes favorable.

A throughput estimator module 306 receives the decoded data from demodulator decoder module 304 and estimates the data throughput. Throughput estimator module 306 may estimate the throughput by counting the number of correctly decoded data bits in a period of time. Throughput may be expressed as bits-per-second and is a function of the transmission parameters, the transmit power, and the channel characteristics.

The receiver may receive information on the current transmit power from the transmitter. For example, the control packet that contains the transmission parameters may also contain information on the current transmit power used by the transmitter to transmit received signal 316 over the transmit chain. A current transmit power information module 308 may store the decoded information on the current transmit power received from demodulator decoder module 304.

A SNR estimator module 310 may operate on the output from receiver frontend 302 to estimate the ratio of the received signal power to the noise power of the transmit chain. The received signal power may be the product of the transmit power from the transmitter and the path gain of the transmit chain. The noise power may include receiver noise and interference from other transmit chains. The SNR of the transmit chain indicates the channel characteristics of the transmit chain. Other indicia of the channel characteristics may include CIR (carrier-to-interference ratio).

A new transmit power determination module 312 adjusts the transmit power for the multiple transmit chains to increase the overall data throughput of the transmit chains while keeping the total transmit power within the maximum power limit. New transmit power determination module 312 takes as its inputs the data throughput estimates, the information on the current transmit power, and the SNRs from one or more other MIMO transmit chains represented as signal 320, in addition to the data throughput estimate, the current transmit power, and the SNR of its own transmit chain. In one embodiment, the new transmit power for a transmit chain may be adjusted to reach a transmit power corresponding to a target throughput for that transmit chain. The remaining transmit power budget may be allocated between the remaining transmit channels. In other embodiments, there is no target throughput for any particular transmit chain, and new transmit power determination module 312 performs a trade-off between the transmit power for all the transmit chains to increase the overall data throughput while maintaining the overall transmit power below the regulatory requirement. New transmit power determination module 312 may also determine the new transmission parameters for the transmit chains corresponding to the new transmit power.

A transmitter 314 transmits the new transmit power for one or more transmit chains on transmit signal 318. Transmitter 314 may also use the new transmission parameters for the transmit chains to the transmitter and/or the new transmit power for transmission of subsequent data to transceiver 300.

Figure 4:
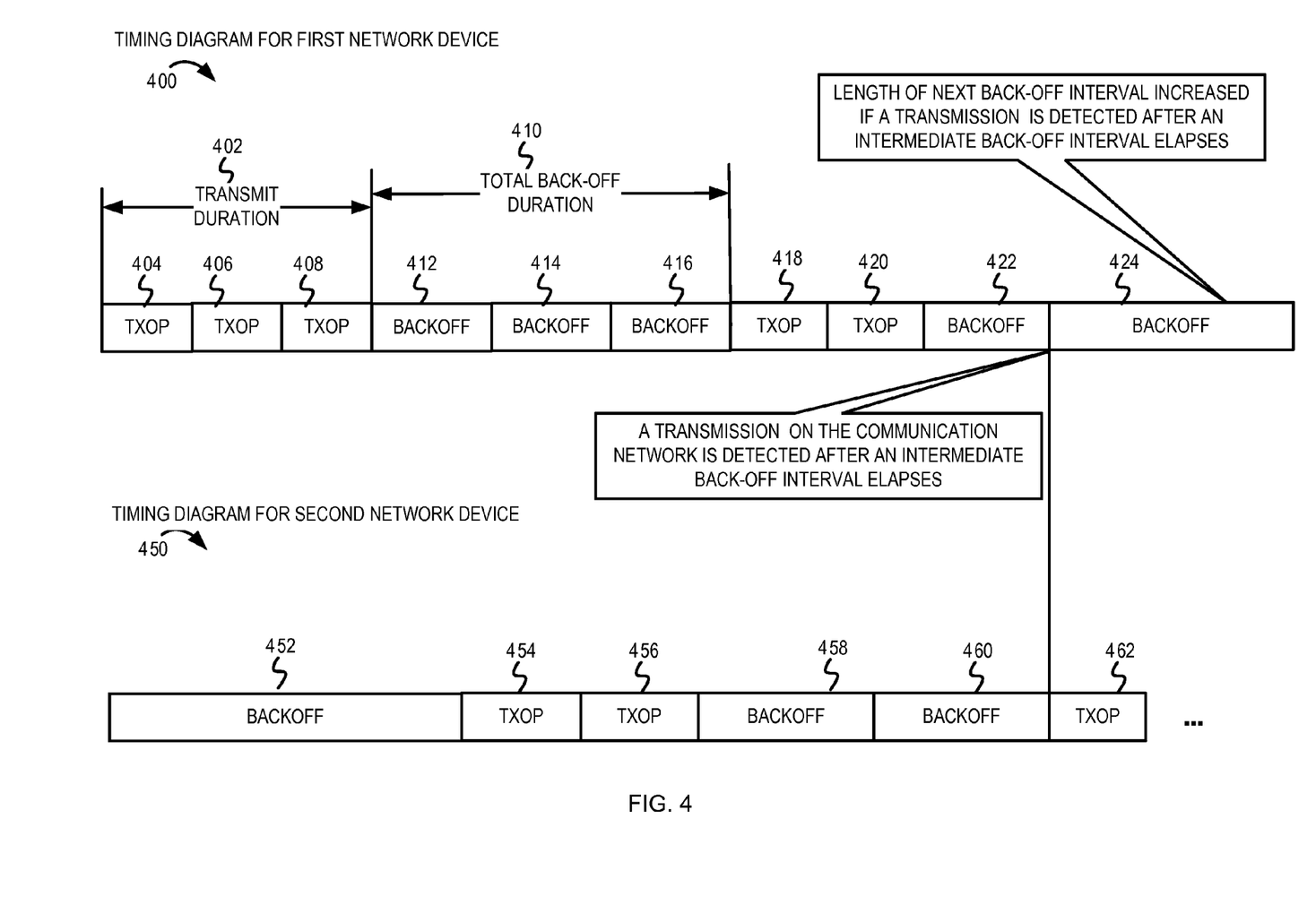
FIG. 4 shows a flow chart for changing the transmit power on the two MIMO transmit chains of FIG. 1 to increase a throughput on one transmit chain to a target level according to one or more embodiments of the present disclosure.

FIG. 4 shows a flow chart for changing the transmit power on, e.g., the two MIMO transmit chains of FIG. 1 to increase a throughput on one transmit chain to a target level according to one or more embodiments of the present disclosure. In 402, transceiver-2 104 receives from transceiver-1 102 information on the current transmit power used for the transmission. The current transmit power for the two transmit chains initially may be equal, or may be selected based on the estimated or expected channel characteristics of the transmit chains. For example, transceiver-1 102 may expect transmit chain-1 106 to have better gain than transmit chain-2 108 based on previous measurements of channel characteristics received from transceiver-2 104. Thus, transceiver-1 102 may select the transmit power for transmit chain-1 106 to be lower than the transmit power for transmit chain-2 108 so that the expected power received at transceiver-2 104 for the two transmit chains may be approximately equal. The transmit power on the two transmit chains are selected so that the overall transmit power will not exceed the regulatory limit.

In 404, transceiver-2 104 measures the throughput of data received on the two transmit chains. Due to possibly different channel characteristics on the two transmit chains, data throughput on the two transmit chains may be different. The measured throughput for a transmit chain may be compared with a target throughput. In one embodiment, the target throughput for a transmit chain may be the measured throughput when operating the transmit chain in a SISO mode. If the measured throughput on the transmit chain is lower than the target throughput, the transmit power on the transmit chain may be increased.

In 406, transceiver-1 102 or transceiver-2 104 calculates the increase in the transmit power needed to raise the throughput on the transmit chain to the target throughput. In the following discussion, transceiver-2 104 is used to illustrate the calculation of the change in transmit power. In one embodiment, transceiver-2 104 may calculate the increase in the transmit power for transmit chain-1 106 based on prior knowledge of the relationship between data throughput and SNR as compiled from historical measurements of channel characteristics. For example, transceiver-2 104 may determine the desired SNR corresponding to the target throughput and may measure the current SNR for transmit chain-1 106. The difference between the desired SNR and the currently measured SNR may be the desired increase in the transmit power for transmit chain-1 106 assuming the noise and interference do not change. In other embodiments, relationships between SNR and other channel characteristics such as CIR may be used to determine the desired increase in the transmit power for transmit chain-1 106. Transceiver-2 104 may determine the final increase in the transmit power based on the current transmit power and the desired increase in the transmit power to ensure that the new transmit power does not exceed the peak transmit power for transmit chain-1 106 or that there is sufficient power amplifier headroom. To maintain the overall transmit power below the regulatory limit, transceiver-2 104 may decrease the transmit power in transmit chain-2 108. In one embodiment, transceiver-2 104 may consider how the SNR for transmit chain-1 106 may change as a result of a change in the interference power from transmit chain-2 108 when the transmit power for transmit chain-2 108 is changed. Thus, transceiver-2 104 may determine the new transmit power for transmit chain-1 106 and transmit chain-2 108 based on the target throughput and the measured throughput for transmit chain-1 106, the current transmit power and measured SNR for the two transmit chains, and the expected interference between the two transmit chains.

In 408, transceiver-1 102 uses the new transmit power for transmit chain-1 106 and transmit chain-2 108 to transmit new data. Transceiver-1 102 may receive the new transmit power or the change in the transmit power with respect to the current transmit power for the two transmit chains from transceiver-2 104. In one embodiment, transceiver-1 102 may receive the measured throughput and the measured SNR for the transmit chains from transceiver-2 104 so that transceiver-1 102, rather than transceiver-2 104, may calculate the new transmit power. While FIG. 4 is discussed in the context of changing the transmit power on downlink data transmission from transceiver-1 102 to transceiver-2 104, the discussion is equally applicable to changing the transmit power on uplink data transmission from transceiver-2 104 to transceiver-1 102. Therefore, transceiver-1 102 and transceiver-2 104 in the above discussion may be interchanged without losing any generalities. Similarly, while two MIMO transmit chains have been presented, the discussion is equally applicable to changing the transmit power on more than two MIMO transmit chains to increase a throughput on one or more of the transmit chains to a target level. It is further noted that, in some embodiments, the operations described in 402-406 of FIG. 4 can be performed by one transceiver (e.g., transceiver-2 104) and the operations described in 408 of FIG. 4 can be separately performed by a different transceiver (e.g., transceiver-1 102), or vice versa. 408 of FIG. 4 is shown with dashed lines to indicate that, in some embodiments, the operations described in 402-406 of FIG. 4 can be performed separately by a different transceiver than the operations described in 408.

Figure 5:
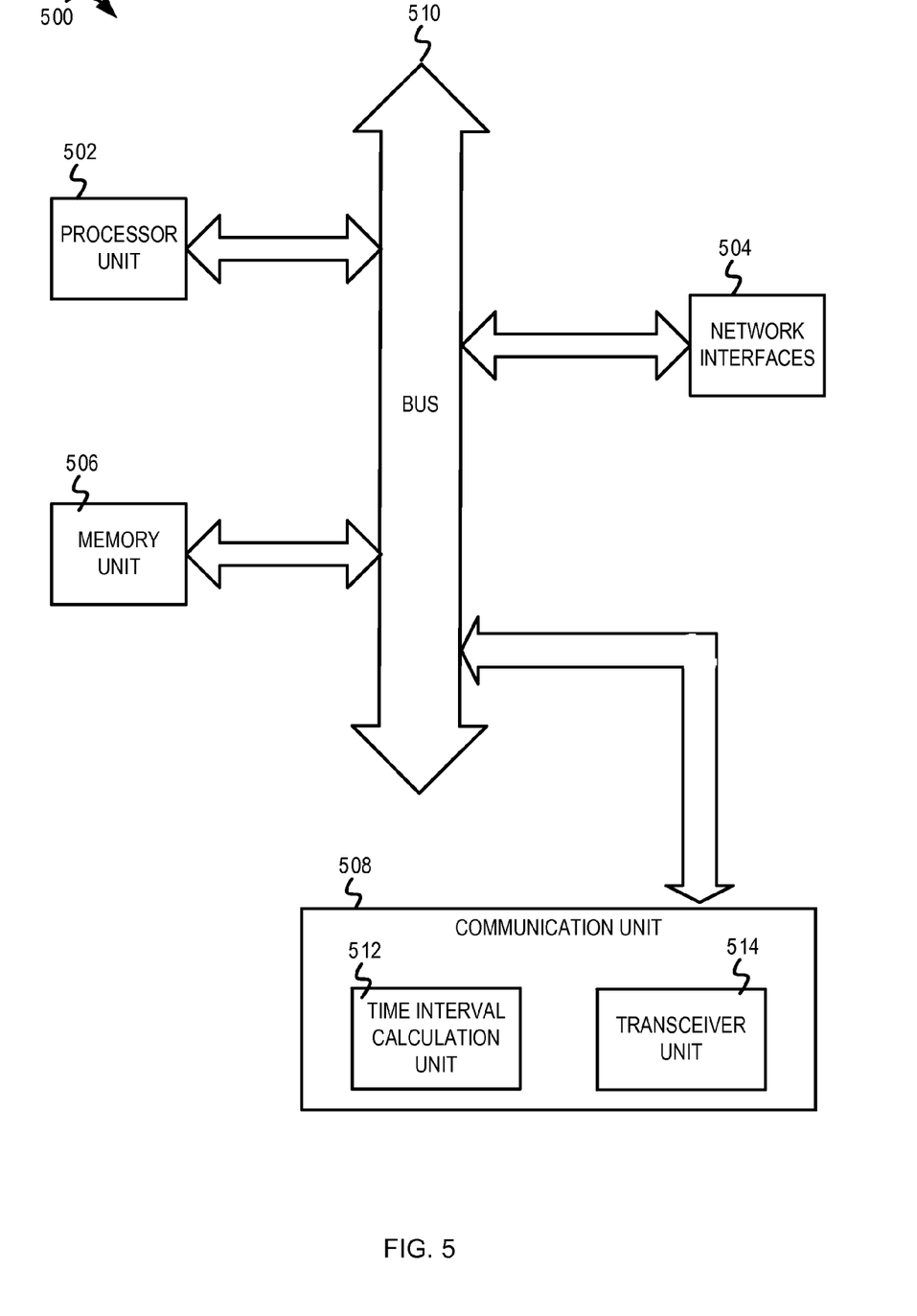
FIG. 5 shows a flow chart for changing the transmit power on the two MIMO transmit chains of FIG. 1 to increase an overall throughput according to one or more embodiments of the present disclosure.

FIG. 5 shows a flow chart of for changing the transmit power on, e.g., the two MIMO transmit chains of FIG. 1 to increase an overall throughput according to one or more embodiments of the present disclosure. In 502, similar to 402 of FIG. 4, transceiver-2 104 receives from transceiver-1 102 information on the current transmit power used for the transmission. Also as in FIG. 4, while FIG. 5 is discussed in the context of changing the downlink transmit power from transceiver-1 102 to transceiver-2 104, the discussion is equally applicable to changing the uplink transmit power from transceiver-2 104 to transceiver-1 102.

In 504, transceiver-2 104 measures the SNR and the data throughput on the two transmit chains. Transceiver-2 104 may have knowledge of the relationship between data throughput on a transmit chain and SNR as compiled from historical measurements of channel characteristics. Transceiver-2 104 may confirm that the relationship still holds true for the current SNR and the current throughput.

In 506, based on the data-throughput/SNR relationship, the measured SNR on the two transmit chains and the current transmit power, transceiver-1 102 or transceiver-2 104 determines the desired SNR and the corresponding transmit power for a first transmit chain to increase the overall throughput. In the following discussion, transceiver-2 104 is used to illustrate the determination of the desired SNR and the transmit power. For example, if two transmit chains have substantially equal transmit power from transceiver-1 102, but one transmit chain has low SNR due to poor channel characteristics (e.g., excessive signal loss caused by fading, interference, etc.), resulting in low throughput, transceiver-2 104 may reduce the transmit power on the transmit chain with the poor channel characteristics and increase the transmit power on the other transmit chain with the better channel characteristics. Other metrics of channel characteristics may include CIR, path gain, etc. Tranceiver-2 104 may determine the transmit chain with the better channel characteristics based on an estimate of which transmit chain will yield higher throughput if the two transmit chains have substantially equal transmit power. Transceiver-2 104 may select the desired SNRs for the two transmit chains so that increasing the SNR on the transmit chain with the better channel characteristics results in increased throughput that will outweigh the small decrease in throughput on the transmit chain with the poor channel characteristics resulting from a decreased in SNR. Transceiver-2 104 may determine the desired transmit power corresponding to the desired SNR for one of the transmit chains, e.g., the transmit chain found to have the better channel characteristics. The desired transmit power for the first transmit chain may be expressed as a change in transmit power by $\Delta_1$.

In 507, transceiver-2 104 determines the desired SNR and the transmit power for the other transmit chain, e.g., the transmit chain found to have the poor channel characteristics. Transceiver-2 104 may adjust the desired transmit power so that the combined transmit power does not exceed the regulatory limit. Transceiver-2 104 may also adjust the desired transmit power to ensure that the transmit power does not exceed the peak transmit power for a transmit chain or that there is sufficient power amplifier headroom. The desired transmit power for the second transmit chain may be expressed as a change in transmit power by $\Delta_2$.

In one embodiment, transceiver-2 104 may evaluate how making changes to the current SNRs for the two transmit chains in view of the data-throughput/SNR relationship may increase the overall data throughput. For example, transceiver-2 104 may discover that the SNR for a first transmit chain may be reduced with minimal effect on the data throughput, and the SNR for a second transmit chain may be increased slightly to yield a significant increase in the data throughput. Therefore, transceiver-2 104 may perform the trade-off between the SNRs for the two transmit chains to increase the overall data throughput. The transceiver may determine the change to the transmit power—$\Delta_1$ and $\Delta_2$, corresponding to the change to the SNRs for the two transmit chains while maintaining the overall transmit power below the regulatory limit.

In 508, transceiver-2 104 determines whether an increase in the data throughput from increasing the transmit power $\Delta_1$ in a first transmit chain is greater than a decrease in the data throughput from decreasing the transmit power $\Delta_2$ in a second transmit chain while keeping the overall transmit power below the regulatory limit. If the answer is yes, in 510, transceiver-2 104 increases the transmit power in the first transmit chain by $\Delta_1$ and decreases the transmit power in the second transmit chain by $\Delta_2$ to increase the overall data throughput while keeping the overall transmit power below the regulatory limit. On the other hand, if the answer is no, in 512, the transceiver-2 104 decreases the transmit power in the first transmit chain by $\Delta_1$ and increases the transmit power in the second transmit chain by $\Delta_2$. While FIG. 5 is discussed in the context of changing the transmit power on two MIMO transmit chains, the discussion is equally applicable to changing the transmit power on more than two MIMO transmit chains to increase an overall throughput while maintaining the overall transmit power below the regulatory limit.

It is contemplated that the methods identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

It is also contemplated that various embodiments provided by the present disclosure may be implemented using hardware, firmware, software, or any combinations thereof. For example, the various transmitters/receivers of transceiver-1 102 or transceiver-2 104 of FIG. 1, or the various hardware components, modules of transceiver 300 of FIG. 3 may be implemented by one or more processors, including but not limited to, processor-1 118, processor-2 128 of FIG. 1, and/or other processing components internal or external to the transceivers. The processors may include a micro-controller, digital signal processor (DSP), or other processing components. The processors may perform specific operations by executing one or more sequences of instructions contained in system memory, including but not limited to, memory-1 119, memory-2 129 of FIG. 1, and/or other memory components internal or external to the transceivers. Logic may be encoded in a computer readable medium, which may refer to any medium that participates in providing instructions to processors for execution. Such a medium may take many forms, including but not limited to, non-volatile media, volatile media, and transmission media. In one embodiment, logic is encoded in non-transitory computer readable medium.

Although embodiments of the present disclosure have been described, these embodiments illustrate but do not limit the disclosure. For example, although automatic compensation of transmit power of MIMO channels are illustrated using wire-line transceivers operating in the HomePlug AV2 network, embodiments of the present disclosure may encompass any communication system employing MIMO technology, including wireless and other wire-line communication systems such as other powerline communications. It should also be understood that embodiments of the present disclosure should not be limited to these embodiments but that numerous modifications and variations may be made by one of ordinary skill in the art in accordance with the principles of the present disclosure and be included within the spirit and scope of the present disclosure as hereinafter claimed.

What is claimed is:

1. A method for communicating over a multiple-input multiple-output (MIMO) channel, the method comprising:
    receiving, by a receiver from a transmitter, information on a first transmit power over at least two transmit chains;
    determining, by the receiver, channel characteristics data including a data throughput for each of the at least two transmit chains; and
    determining, by the receiver, a second transmit power for at least one transmit chain of the at least two transmit chains using the first transmit power and at least one member of the group consisting of the channel characteristics data and a target throughput,
    wherein:
        the second transmit power increases a total data throughput for the at least two transmit chains,
        a total transmit power including the second transmit power is below a maximum transmit power, and
        determining the second transmit power using the first transmit power and the target throughput includes:
            selecting the target throughput corresponding to a throughput for a single-input single-output (SISO) channel,
            determining a desired channel characteristic corresponding to the target throughput,
            determining that the data throughput for the at least one transmit chain is lower than the target throughput, and
            determining the second transmit power for the at least one transmit chain based, at least in part, on a difference between the desired channel characteristic and the channel characteristics data.

2. The method of claim 1, further comprising:
    selecting, by the receiver, the at least two transmit chains from more than two transmit chains in the MIMO channel.

3. The method of claim 1, further comprising:
    feeding back, by the receiver, information on the second transmit power for the at least one transmit chain to the transmitter.

4. The method of claim 1, wherein the channel characteristics data includes a signal-to-noise ratio (SNR) for each of the at least two transmit chains.

5. The method of claim 1, further comprising:
    receiving, by the receiver, a current transmission parameter used on the information transmitted over each of the at least two transmit chains from the transmitter, and
    determining by the receiver a new transmission parameter for use with the second transmit power for the at least one transmit chain.

6. The method of claim 5, wherein the current transmission parameter includes a modulation mode of the information transmitted for each of the at least two transmit chains.

7. The method of claim 1, wherein said determining, by the receiver, the second transmit power using the first transmit power and the channel characteristics data comprises:
    comparing the channel characteristics data for the at least two transmit chains to determine a first transmit chain that has a better channel characteristics data based, at least in part, on an estimate that the first transmit chain yields a higher throughput when the at least two transmit chains have substantially equal transmit power,
    increasing the first transmit power for the first transmit chain, and
    decreasing the first transmit power for a second transmit chain of the at least two transmit chains.

8. The method of claim 7, wherein the channel characteristics data further includes a signal-to-noise ratio (SNR) for each of the at least two transmit chains, and wherein the first transmit chain has a higher SNR than the second transmit chain.

9. The method of claim 1, wherein said determining, by the receiver, the second transmit power comprises:
    increasing the first transmit power for a first transmit chain and decreasing the first transmit power for a second transmit chain such that an increase in data throughput corresponding to the second transmit power for the first transmit chain is greater than a decrease in data throughput corresponding to the second transmit power for the second transmit chain.

10. The method of claim 1, wherein said determining, by the receiver, the second transmit power is based, at least in part, on knowledge of a relationship between the first transmit power and a signal-to-noise ratio (SNR) for the at least one transmit chain.

11. A method for communicating over a multiple-input multiple-output (MIMO) channel, the method comprising:
transmitting, by a transceiver, information on a current transmit power each of at least two transmit chains;
receiving, by the transceiver over the at least two transmit chains, channel characteristics data including a data throughput for each of the at least two transmit chains; and
determining, by the transceiver, a new transmit power for at least one transmit chain of the at least two transmit chains,
wherein:
the new transmit power is based, at least in part, on the current transmit power and at least one member of the group consisting of the channel characteristics data and a target throughput,
the new transmit power increases a total data throughput over the at least two transmit chains and keeps a total power including the new transmit power below a maximum transmit power, and
determining the new transmit power based, at least in part, on the current transmit power and the target throughput includes:
selecting the target throughput corresponding to a throughput for a single-input single-output (SISO) channel,
determining a desired channel characteristic corresponding to the target throughput,
determining that the data throughput for the at least one transmit chain is lower than the target throughput, and
determining the new transmit power for the at least one transmit chain based, at least in part, on a difference between the desired channel characteristic and the channel characteristics data.

12. The method of claim 11, further comprising:
selecting by the transceiver the at least two transmit chains from a plurality of more than two transmit chains in the MIMO channel.

13. The method of claim 11, wherein the channel characteristics data further includes a signal-to-noise ratio (SNR) for each of the at least two transmit chains.

14. The method of claim 11, further comprising:
determining, by the transceiver, a new transmission parameter for use with the new transmit power for the at least one transmit chain.

15. The method of claim 11, wherein said determining, by the transceiver, the new transmit power based, at least in part, on the current transmit power and the channel characteristics data comprises:
comparing the channel characteristics data for the at least two transmit chains to determine a first transmit chain of the two transmit chains that has better channel characteristics data than a second transmit chain of the two transmit chains based, at least in part, on an estimate that the first transmit chain yields a higher throughput than the second transmit chain when the two transmit chains have approximately equal transmit power;
increasing the current transmit power for the first transmit chain; and
decreasing the current transmit power for the second transmit chain.

16. The method of claim 15, wherein the channel characteristics data further includes a signal-to-noise ratio (SNR) for each of the at least two transmit chains, and wherein the first transmit chain has a higher SNR than the second transmit chain.

17. The method of claim 11, wherein said determining, by the transceiver, the new transmit power comprises increasing the current transmit power for a first transmit chain and decreasing the current transmit power for a second transmit chain such that an increase in data throughput corresponding to the new transmit power for the first transmit chain is greater than a decrease in data throughput corresponding to the new transmit power for the second transmit chain.

18. A communications device for communicating over a MIMO channel, the communications device comprising:
a receiver to receive data over at least two transmit chains, wherein the data includes information on a current transmit power used to transmit the data over each of the at least two transmit chains;
a channel characteristics module to determine channel characteristics data for each of the at least two transmit chains, wherein the channel characteristics data includes a data throughput for each of the at least two transmit chains; and
a new transmit power determination module to determine a new transmit power for at least one transmit chain of the at least two transmit chains based, at least in part, on the current transmit power and at least one member of the group consisting of the channel characteristics data and a target throughput so as to increase a total data throughput over the at least two transmit chains and to keep a total power including the new transmit power below a maximum transmit power;
wherein:
in determining the new transmit power based, at least in part, on the current transmit power and the channel characteristics data, the new transmit power determination module is to:
compare the channel characteristics data for the at least two transmit chains to determine a first transmit chain of the two transmit chains that has better channel characteristics data than a second transmit chain of the two transmit chains based, at least in part, on an estimate that the first transmit chain yields a higher throughput than the second transmit chain when the at least two transmit chains have approximately equal transmit power,
cause the communications device to increase the current transmit power for the first transmit chain, and
cause the communications device to decrease the current transmit power for the second transmit chain;
in determining the new transmit power based, at least in part, on the current transmit power and the target throughput, the new transmit power determination module is to:
select the target throughput corresponding to a throughput for a single-input single-output (SISO) channel,
determine a desired channel characteristic corresponding to the target throughput,
determine if the data throughput for the at least one transmit chain is lower than the target throughput, and
if the data throughput for the at least one transmit chain is lower than the target throughput, determine the new transmit power for the at least one transmit chain based, at least in part, on a difference between the desired channel characteristic and the channel characteristics data.

19. The communications device of claim 18, wherein the receiver is further to select the at least two transmit chains from a plurality of more than two transmit chains in the MIMO channel.

20. The communications device of claim 18, further comprising a transmitter to transmit information regarding the new transmit power over one or more of the at least two transmit chains.

21. The communications device of claim 18, wherein the channel characteristics data further includes a signal-to-noise ratio (SNR) for each of the at least two transmit chains.

22. The communications device of claim 18, wherein the receiver is further to receive information on current transmission parameters used on the data transmitted over each of the at least two transmit chains, and wherein the new transmit power determination module is further to determine a new transmission parameter for use with the new transmit power for the at least one transmit chain.

23. The communications device of claim 18, wherein a new data throughput corresponding to the new transmit power reaches a target throughput for the at least one transmit chain.

24. The communications device of claim 18, wherein the new transmit power determination module is to increase the current transmit power for a first transmit chain and to decrease the current transmit power for a second transmit chain such that an increase in data throughput corresponding to the new transmit power for the first transmit chain is greater than a decrease in data throughput corresponding to the new transmit power for the second transmit chain.

\* \* \* \* \*